United States Patent
Kasai et al.

[11] Patent Number: 5,880,437
[45] Date of Patent: Mar. 9, 1999

[54] AUTOMATIC CONTROL SYSTEM AND METHOD USING SAME

[75] Inventors: Shigeru Kasai; Hiroyuki Miyashita, both of Yamanashi-ken, Japan

[73] Assignee: Tokyo Electron Limited, Tokyo-to, Japan

[21] Appl. No.: 917,873

[22] Filed: Aug. 27, 1997

[30] Foreign Application Priority Data

Sep. 3, 1996 [JP] Japan .................................. 8-252411

[51] Int. Cl.$^6$ ...................................................... H05B 1/02
[52] U.S. Cl. ..................... 219/497; 219/505; 219/483; 392/416; 364/557; 374/137; 118/725
[58] Field of Search ........................ 219/497, 483–486, 219/501, 505; 392/416–422; 156/345; 364/557; 374/137; 118/724, 725

[56] References Cited

U.S. PATENT DOCUMENTS

| | | | |
|---|---|---|---|
| 5,624,590 | 4/1997 | Fiory | 219/390 |
| 5,715,361 | 2/1998 | Moslehi | 392/416 |
| 5,790,750 | 8/1998 | Anderson | 392/416 |

FOREIGN PATENT DOCUMENTS 62-266302  11/1987  Japan .
63-282441  11/1988  Japan .

*Primary Examiner*—Mark H. Paschall
*Attorney, Agent, or Firm*—Beveridge, DeGrandi, Weilacher & Young, LLP

[57] ABSTRACT

An automatic control system controls a controlled variable serving as an object 2 to be controlled so that the object 2 approaches a predetermined target value, by means of an optimum regulator 4. The automatic control system include: a gain setting section 48 for setting a gain; a comparing section 48 for comparing the target value with the controlled variable serving as the object; and a weight control section 50 for weighting the gain set by the gain setting section so as to increase the weight from 0 to 1 within a predetermined period of time and for deriving a corrected manipulated variable in response to the time when a difference between the target value and the controlled variable comes within a range of a predetermined percentage of the target value, so that the corrected manipulated variable is added to the manipulated variable derived by the optimum regulator. Thus, the gain is controlled so as to gradually increase only within a restricted range, so that it is possible to quickly and accurately control an object.

8 Claims, 7 Drawing Sheets

AUTOMATIC CONTROL SYSTEM AND METHOD USING SAME

BACKGROUND OF THE INVENTION

1. Field of the Invention

The present invention relates generally to an automatic control system for use in a temperature control system for a semiconductor equipment, and an automatic control method using the same. More specifically, the invention relates to an automatic control system having an improved optimum regulator, and an automatic control method using the same.

2. Description of the Prior Art

In general, in order to fabricate a semiconductor device such as an integrated circuit, it is required to repeatedly carry out various treatments, such as a film forming treatment at elevated temperatures, an oxidation and diffusion treatment and an etching treatment, with respect to an object to be processed, such as a semiconductor wafer.

For example, in the case of a sheet-type thermal treatment equipment, a semiconductor wafer mounted on a mounting table in a processing container is heated to a process temperature, e.g., a temperature of about 500° to 600° C., by heating means, e.g., a heating lamp, to carry out predetermined treatments, e.g., a film forming treatment and an oxidation treatment.

Thus, when a semiconductor wafer is treated at elevated temperatures, it is important whether the temperature of the wafer can be accurately maintained at a process temperature in order to ensure the uniformity of thermal treatment, and how the temperature of the wafer can be risen to the process temperature in order to obtain a high throughput and whether the process temperature can be maintained without causing overshoot.

With respect to the temperature control of a wafer, in place of a classical control theory wherein a control system is designed on the basis of frequency characteristics around a single input and a single output, a modern control theory suitable for a complicated system, such as a digital control of a system having multiple inputs and multiple outputs, has been used (e.g., see "Mechanical System Control"; Mar. 20, 1984; Ohm).

In this modern control theory, studies of optimum controllability and stability for controlling so as to minimize a performance function in a given specification have been actively made, and the state expression, which express the input-output relationship as well as the internal state, is used as the expression of the system.

In a method for designing a control system on the basis of an equation of state which expresses a state expression as an equation, a regulator for stabilizing a closed loop system and for improving the excessive characteristics thereof has been used. In this case, it is hardly possible to directly measure all the state variables. In this case, a state observer is used.

A typical automatic control system for use in a temperature control system for a semiconductor equipment will be described. FIG. 7 is a functional block diagram of an example of a typical automatic control system for use in a temperature control system for a semiconductor equipment.

In the diagram, reference number 2 denotes an object to be controlled, such as a wafer in a semiconductor equipment, and the temperature of this object is controlled. Reference number 4 denotes an optimum regulator for determining a matrix of feedback coefficients so as to minimize an appropriate performance function and for finding a compromise point of necessary equations. Reference numbers 8 and 10 denote an integrator gain and an integrator, respectively.

In addition, reference number 12 denotes a state stabilizer gain, and reference number 14 denotes a state observer. In the state feedback control, this system is a most basic system since the state is a minimum amount of information for determining the behavior of the system. In this system, the value of a state variable can not be directly measured according to circumstance. In such a case, the value of the state variable is presumed by means of the state observer 14 on the basis of the output of the object to be controlled, the output being able to be directly measured.

The temperature obtained via a thermocouple from the object 2 to be controlled, i.e., a controlled variable, is returned to an adder 6 and added therein so as to have a negative sign, so that the difference between the obtained temperature and a set temperature serving as a target value is derived. This difference is tempered by a gain of the integrator gain 8, and integrated by the integrator 10 to derive a manipulated variable.

On the other hand, a state variable, which can not be measured, is derived by means of the state observer 14 on the basis of the measured controlled variable. The derived state variable and the measured state variable are tempered by a gain of the state stabilizer gain 12 to derive a manipulated variable. The manipulated variable thus derived is added, in an adder 16, to the manipulated variable derived in the integrator 10, so that the temperature of the object 2 is controlled on the basis of the added amount. Furthermore, all of these operations are carried out by means of a software using a microcomputer or the like.

In a control system of this type, a single gain is generally set. In addition, most of actual systems are non-linear systems. In these systems, it is required to stably respond to all the control region, so that a stably operable maintenance gain is must be selected as a set gain.

That is, in a control region wherein the rate of state variation of the control system is higher than that of the control region, since there is an unstable factor for the control, a gain must be set so as not to immediately respond to a very fast change of state.

Therefore, it takes a lot of time until the controlled variable of the object to be controlled is stabilized after approaching a target value, so that there is a problem in that a sufficiently fast control can not be carried out.

In addition, in order to eliminate the aforementioned problem, if separate gains are provided for the respective temperature zones similar to conventional systems, a great number of parameters (state variable×temperature zone+α) must be provided, so that there is a problem in that the system has a complicated design.

SUMMARY OF THE INVENTION

It is therefore an object of the present invention to eliminate the aforementioned problems and to provide an automatic control system and an automatic control method, which can accurately control an object at a high speed.

The inventors have studied diligently the modern control theory, found that it is possible to set a high gain only within a narrow control region wherein a controlled variable of an object to be controlled is approximately a target value since the controlled variable can be a linear therein, and made the present invention.

In order to accomplish the aforementioned and other objects, according to one aspect of the present invention, there is provided an automatic control system for controlling a controlled variable serving as an object to be controlled so that the object approaches a predetermined target value. The automatic control system comprises: an optimum regulator for deriving a manipulated variable so that a controlled variable serving as an object to be controlled approaches a predetermined target value; a comparing section for comparing the target value with the controlled variable serving as the object to derive a difference between the target value and the controlled variable; a gain setting section for setting a gain serving to amplify the difference derived by the comparing section; and a weight control section for weighting the gain set by the gain setting section so as to increase the weight from 0 to 1 within a predetermined period of time, and for deriving a corrected manipulated variable by amplifying the difference by a weighed gain in response to the time when the difference comes within a range of a predetermined percentage of the target value, the weighted gain corresponding to a weighted gain at a time after the difference comes within the range of the predetermined percentage of the target value, the weight control section outputting the corrected manipulated variable so as to add the corrected manipulated variable to the manipulated variable derived by the optimum regulator.

In this control system, when the controlled variable of the object to be controlled is beyond the predetermined range of the target value, it is controlled similar to conventional methods. When the controlled variable comes within the predetermined range of the target value, the weight control section carries out the weighting of the gain, which has been set in the gain setting section, so as to gradually increase a weight from 0 to 1 within a predetermined period of time, and outputs the manipulated variable on the basis of the weighted gain. Therefore, it is possible to set a high gain only within a restricted narrow region, and it is also possible to accurately control the object at a high speed without causing the discontinuous point of the control.

When the difference is deviated from the predetermined range due to the input of disturbance or the change of the target value during the control by the high gain, if the output of the weight control section is inputted to an integrator of the optimum regulator, no discontinuous point is caused.

Such an object to be controlled may be a semiconductor equipment, and the controlled variable may be the temperature of a semiconductor wafer serving as an object to be processed in the semiconductor equipment.

According to the present invention, an automatic control system and an automatic control method have the following superior functions and advantages.

The object is controlled by the optimum regulator only within the narrow control region, wherein the controlled variable of the object can be regarded as a linear, using a gradually increasing large gain. Therefore, it is possible to accurately control the object at a high speed, and no discontinuous point of control occurs.

In addition, even if the difference is deviated from the predetermined range due to disturbance and so forth, the manipulated variable from the weight control section is immediately changed to zero to be added to the integrator. Therefore, no discontinuous point of control occurs.

In particular, if the present invention is applied to a temperature control system of a semiconductor equipment, it is possible to quickly stabilize the temperature of an object to be processed, so that it is possible to improve the through put.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Referring now to the accompanying drawings, the preferred embodiment of an automatic control system and a method using the same, according to the present invention, will be described below.

Figure 1:
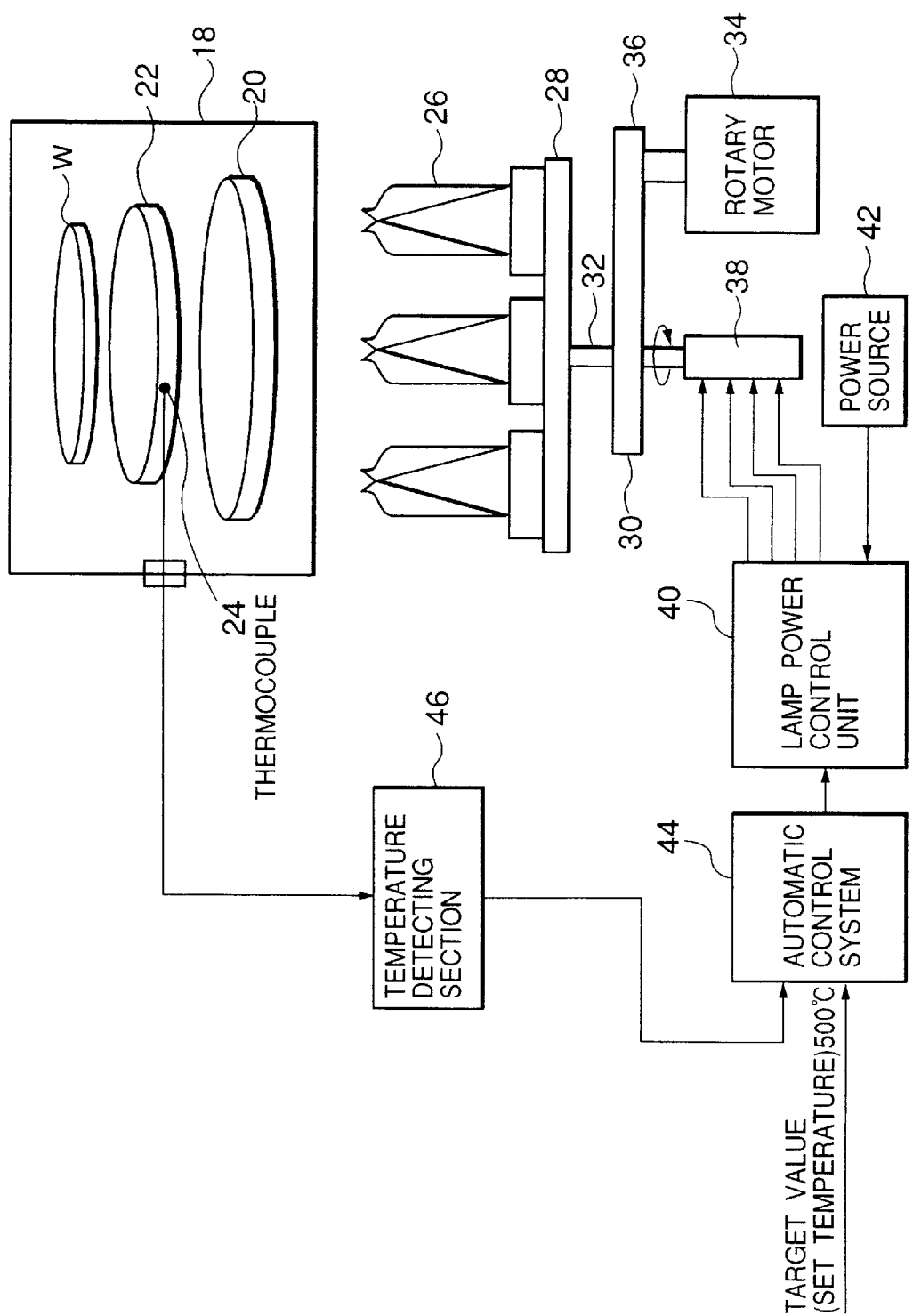
FIG. 1 is a schematic block diagram showing a semiconductor equipment serving as an object to be controlled.
Figure 2:
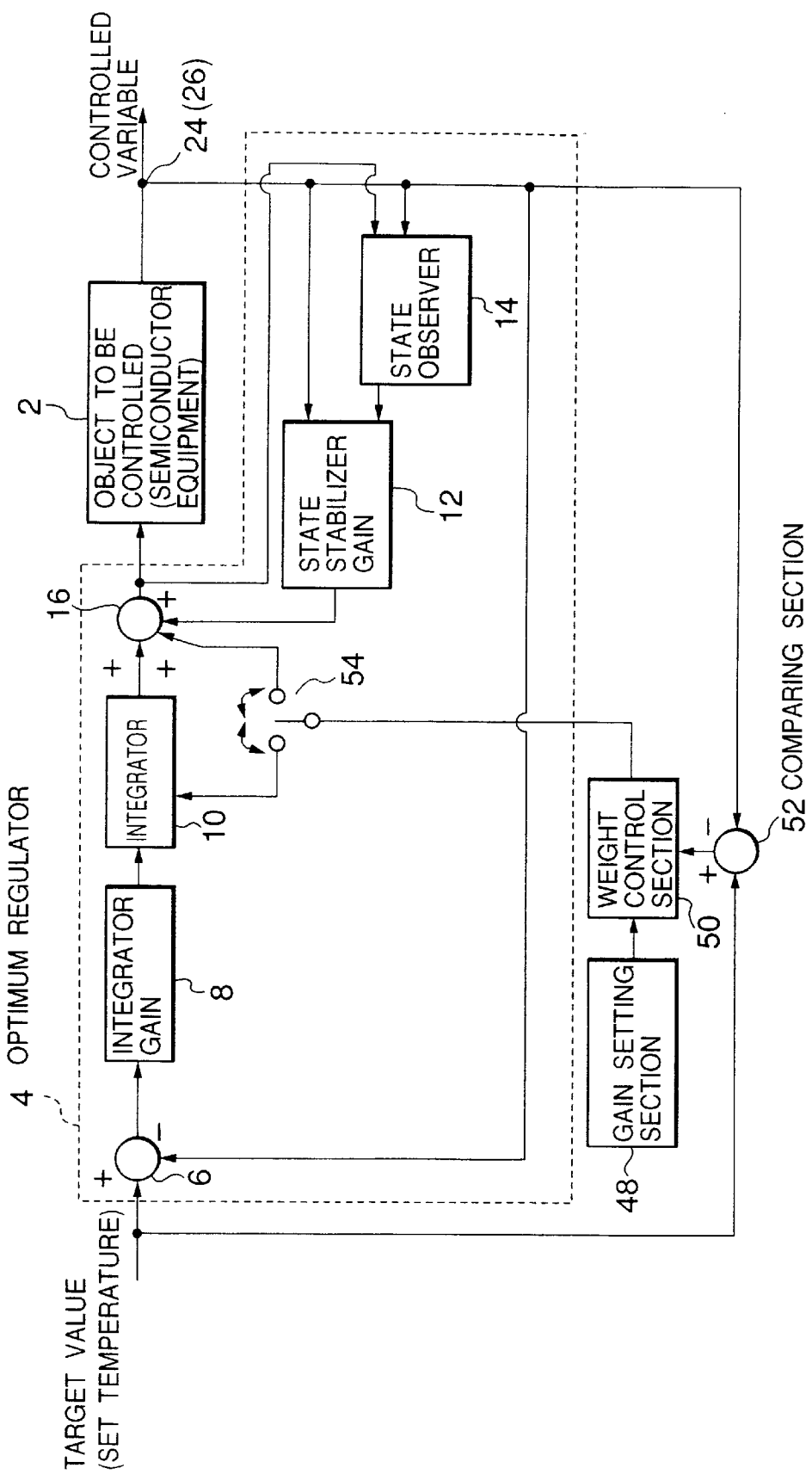
FIG. 2 is a block diagram of an automatic control system for use in the equipment of FIG. 1.

FIG. 1 is a schematic block diagram showing a semiconductor equipment serving as an object to be controlled, FIG. 2 is a block diagram of an automatic control system for use in the equipment of FIG. 1, and FIG. 3 is a graph showing the variation of gain.

Figure 7:
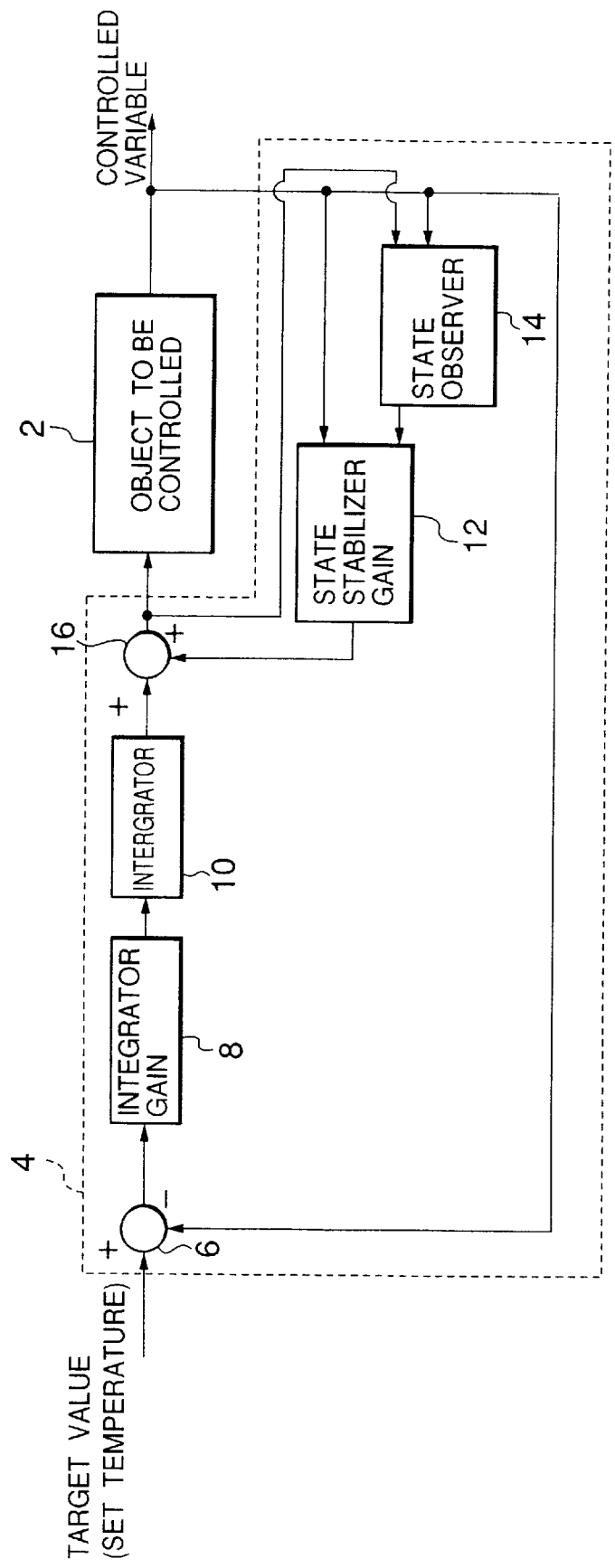
FIG. 7 is a block diagram of a typical automatic control system.

In this preferred embodiment, an automatic control system of the present invention is applied to a temperature control system for controlling the temperature of a semiconductor wafer in a semiconductor equipment. Furthermore, the same reference numbers as those shown in FIG. 7 are used for the same elements as those shown in FIG. 7.

First, a semiconductor equipment shown in FIG. 1 will be described. In FIG. 1, reference number 18 denotes a processing container of, e.g., aluminum, arranged on a cylindrical body. The interior of the processing container 18 is designed to be evacuated with a vacuum pump (not shown). The bottom of the processing container 18 is formed with a transmission window 20 of, e.g., a transparent quartz, which allows heat rays to pass therethrough. Above the transmission window 20, a mounting table 22 of, e.g., a thin graphite, is provided for mounting thereon a semiconductor wafer W serving as an object to be processed.

A thermocouple 24 serving as temperature detecting means for indirectly detecting the temperature of the semiconductor wafer W is inserted into the mounting table 22. In the shown embodiment, although a single thermocouple 24 is shown, a plurality of thermocouples, e.g., three thermocouples, are usually provided.

Below the transmission window 20, a plurality of tungsten lamps 26 serving as heating means are fixedly mounted on a lamp table 28. One end of a rotating shaft 32 is secured to the bottom surface of the lamp table 28. A driven gear 30 is fixed to an intermediate portion of the rotating shaft 32 so that the rotating shaft 32 rotates with the driven gear 30. The driven gear 30 engages a driving gear 36 connected to a drive shaft of a rotary motor 34 so as to rotate the lamp table 28 during the processing of the wafer.

The rotating shaft 32 is provided with a slip ring 38, so that electric power is supplied from a power source 42 to the lamps 26 via a lamp power control unit 40 and the slip ring 38.

The lamp power control unit 40 controls a power supply in response to a command outputted from an automatic control system 44 comprising, e.g., a microcomputer and so forth, according to the present invention. To the automatic control system 44, a detected temperature value (a controlled variable) is inputted from a temperature detecting section 46 for detecting the temperature at the thermocouple 24, as well as a target value (a set temperature) is inputted from a host computer (not shown) for controlling the operation of the whole semiconductor equipment.

Referring to FIG. 2, a functional block of the automatic control system will be described below.

The main feature of the present invention is that a gain setting section 48 and a weight control section 50, which are operated at only a particular narrow control region, are added to a typical automatic control system shown in FIG. 7. That is, in FIG. 2, reference number 2 denotes an object to be controlled, such as a wafer, in the semiconductor equipment, and the temperature of the object is controlled.

Reference number 4 denotes an optimum regulator for determining a matrix of feedback coefficients so as to minimize an appropriate performance function and for finding a compromise point of necessary equations. Reference numbers 8 and 10 denote an integrator gain and an integrator, respectively.

In addition, reference number 12 denotes a state stabilizer gain, and reference number 14 denotes a state observer. In the state feedback control, this system is a most basic system since the state is a minimum amount of information for determining the behavior of the system. In this system, the value of a state variable can not be directly measured according to circumstance. In such a case, the value of the state variable is presumed by means of the state observer 14 on the basis of the output of the object to be controlled, the output being able to be directly measured.

The temperature obtained via a thermocouple 24 from the object 2 to be controlled, i.e., a controlled variable, is returned to an adder 6 and added therein so as to have a negative sign, so that the difference between the obtained temperature and a set temperature serving as a target value is derived. This difference is tempered by a gain of the integrator gain 8, and integrated by the integrator 10 to derive a manipulated variable.

On the other hand, a state variable, which can not be measured, is derived by means of the state observer 14 on the basis of the measured controlled variable. The derived state variable and the measured state variable are tempered by a gain of the state stabilizer gain 12 to derive a manipulated variable. The manipulated variable thus derived is added, in an adder 16, to the manipulated variable derived in the integrator 10, so that the temperature of the object 2 is controlled on the basis of the added manipulated variable.

According to the present invention, the gain setting section 48 and the weight control section 50 are added to the system having the aforementioned construction.

A comparing section 52 comprises an adder for comparing the target value with the controlled variable detected by the thermocouple 24 to derive a difference between the target value and the controlled variable. This difference is inputted to the weight control section 50. The gain setting section 48 allows an operator to set a high gain K, which has been set according to the control system, to an optional gain.

When the difference derived by the comparing section 52 comes within a predetermined percentage of the target value, e.g., within 10% of the absolute value of the target value, the weight control section 48 outputs a corrected manipulated variable, which is derived by weighting the gain K so as to increase from 0 to 1 within a predetermined period of time, e.g., 10 seconds.

Thus, in a very narrow control region, e.g., within 10% of the absolute value of the target value, the variation of the controlled variable of the object to be controlled can be regarded as a linear.

Therefore, in such a narrow control region, a maintenance stability controllable gain is added to the manipulated variable derived in the optimum regulator 4, so that it is possible to obtain a stable response even if the corrected manipulated variable derived by a high gain is added. In view of this point, the present invention has been made.

In this case, in order to prevent the discontinuity of control from occurring, the high gain K is not directly added, and the gain is gradually increased to K by weighting the gain so as to increase from 0 to 1 within a period of time corresponding to a time constant of the control system, e.g., within 10 seconds in this case.

The corrected manipulated variable derived by the weight control section 50 is inputted, via a switching section 54, to the adder 16 upstream of the object 2 to be controlled. During this operation, immediately when the aforementioned difference exceeds the predetermined range (±10% of the target value) due to the change of target value or the input of disturbance and so forth, the switching section 54 is switched so that the corrected manipulated variable is inputted to the integrator 10. Thus, the continuity of control is ensured.

The operation of the system of the aforementioned construction will be described below.

As shown in FIG. 1, when an untreated semiconductor wafer W is mounted on the mounting table 22 in the processing container 18, the processing container 18 is closed and evacuated to a predetermined process pressure. At this time, the mounting table 22 is irradiated with strong heat rays from the tungsten lamps 26, so that the wafer W is indirectly heated.

When the temperature of the wafer W reaches the process temperature, a processing gas is supplied from a gas supply system (not shown), so that predetermined treatments, e.g., a film forming treatment, are carried out.

The temperature of the wafer W is detected by the thermocouple 24 inserted into the mounting table 22 to be derived by the temperature detecting section 45. The derived temperature is inputted to the automatic control system 44 as a controlled variable. This controlled variable is compared with the target value indicated by the host computer or the like. The lamp power control unit 40 controls the power supplied to the lamp 26 so that the difference derived from the compared results is removed.

The control of the feed to the lamp when the temperature of the wafer is risen will be described below. Furthermore, it is assumed that the target value of the temperature of the wafer is set to be 500° C., and the start timing of the weighting of the gain K is the time when the detected value serving as the controlled variable becomes 450° C., i.e., within ±10% of the target value. In addition, it is assumed that the period of time for increasing the weight from 0 to 1 is set to be 10 seconds.

First, when a wafer W of an ordinary temperature is introduced into the processing container 18, the temperature detected by the thermocouple 24 is far lower than 450° C. Until this temperature reaches 450° C., the temperature control, which has been carried out by conventional methods, is carried out by the optimum regulator 4. That is, during this, since the absolute value of the difference between the target value and the controlled variable is higher than 50° C., the manipulated variable from the weight control section 50 is 0 (zero).

Then, when the temperature of the wafer is gradually risen to reach 450° C., the weight control section 50 carries out the weighting so as to gradually increase the gain K, which has been set at the gain setting section 48, from 0 to 1, e.g., over a period of 10 seconds, and outputs a manipulated variable on the basis of the increased gain.

Figure 3A:
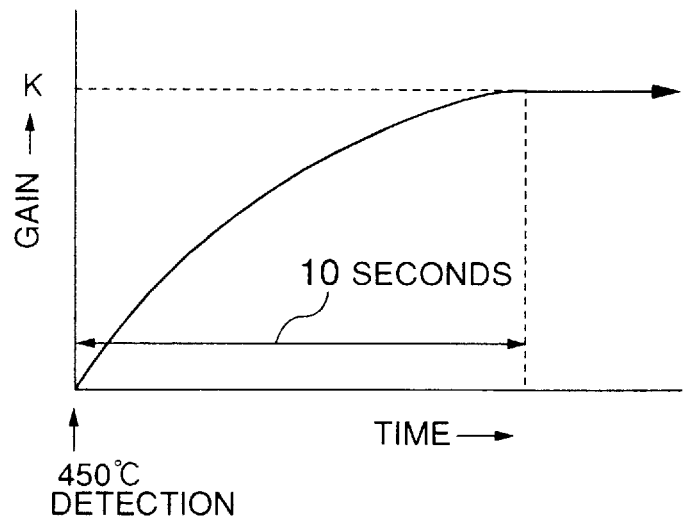
FIG. 3A is a graph showing the variation of state gain when a manipulated variable is outputted on the basis of a gain K preset by a gain setting section, the gain K being weighted so as to gradually increase from 0 to 1, e.g., over a period of 10 seconds.

FIG. 3(A) shows the state at this time. As shown in FIG. 3(A), when the thermocouple 24 detects 450° C., the gain is gradually and continuously increased from 0 to K over a period of 10 seconds. The corrected manipulated variable derived by the gain is inputted to the adder 16 via the switching section 54, and added to the manipulated variables inputted from the integrator 10 and the state stabilizer gain 12.

As mentioned above, within the narrow control region, e.g., within ±10% of the target value, the variation of the controlled variable of the object to be controlled can be regard as a linear. Therefore, if the weight control section 50 is restrictively operated in this narrow control region, it is possible to set a high gain to be within the narrow control region, so that it is possible to quickly and accurately carry out a stable control. In addition, there is no discontinuity of control.

In addition, during the control of such a high gain, in a case where it is deviated from the range of ±10% of the aforementioned target value when the setting of the target value is changed or when a disturbance enters, the corrected manipulated variable outputted from the weight control section 50 is 0 (zero), and the pervious controlled variables are stored in the integrator 10, so that the switching section 54 is switched to add the output of the weight control section 50 to the integrator 10 so as to remove the discontinuity of control.

Figure 3B:
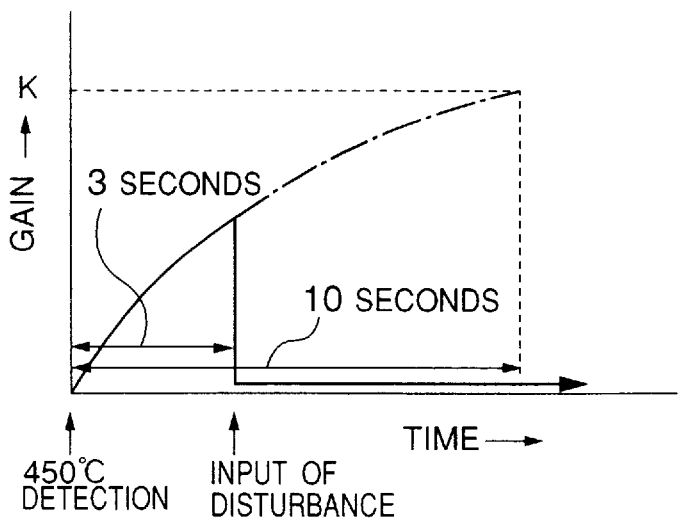
FIG. 3B is a graph showing the variation of gain in a case where the discontinuity of control is removed by setting a corrected manipulated variable, which is outputted from a weight controller, to be 0 (zero) and switching a switching section so as to add an output of a control section to an integrator, when a difference is deviated from a predetermined range of target value due to the change of the target value or disturbance during the control of a high gain.

FIG. 3(B) shows an example of such a state, e.g. the state when a disturbance enters three seconds after 450° C. is detected. At this time, the output of the weight control section 50 is 0, so that the output thereof is inputted to the integrator 10.

Figure 4:
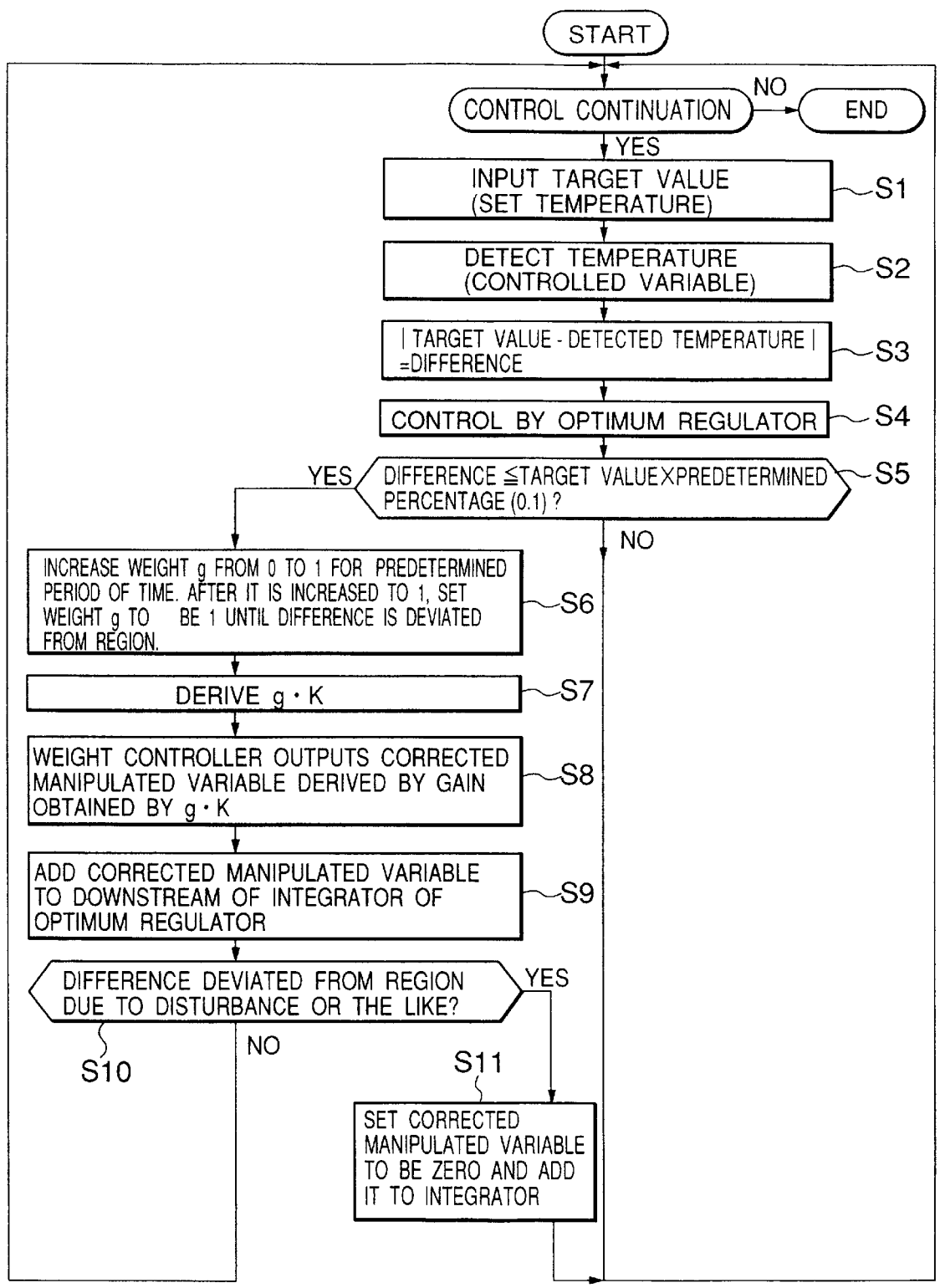
FIG. 4 is a flowchart showing a control operation by an automatic control method according to the present invention.

As mentioned above, all the aforementioned operations are processed by a software. Referring to the flowchart of FIG. 4, the aforementioned operations will be described below. First, when a target value is inputted (S1) and the temperature control is started, the temperature of the wafer W is always detected by the thermocouple 24 (S2). In the comparing section 52, the detected temperature value is compared with the target value to derive a difference between the detected temperature value and the target value as an absolute value (S3). Then, the control is carried out by only the optimum regulator 4 (S4). Then, it is determined whether the difference comes within a predetermined percentage, e.g., ±10%, of the target value in the weight control section 50 (S5). When it is NO, i.e., when the different is greater than the predetermined region, the control is not carried out by the weight control section 50.

On the other hand, when it is YES at S5, i.e., when the temperature of the wafer W is risen and the difference decreases to be within the predetermined region, the weight g is gradually increased from 0 to 1 over a predetermined period of time, e.g., 10 seconds. Thereafter, the weight g is set to be 1 while it is YES at S5 (S6). Then, the weight g is multiplied by a preset gain K to derive a gain g·K at that time (S7), and a corrected manipulated variable derived from the obtained gain g·K is outputted (S8). The corrected manipulated variable is inputted to the adder 16 provided downstream of the integrator 10 of the optimum regulator 4, and added to another manipulated variable derived by the optimum regulator 4.

On the other hand, immediately when the aforementioned difference is deviated from the predetermined region due to disturbance and so forth (YES at S10), the weight g becomes zero and the corrected manipulated variable of the weight control section 50 also becomes zero. Then, the output thereof is added to the integrator 10 (S11) so as to remove the discontinuity of control.

The variation of temperature controlled by a conventional method and the variation of temperature controlled according to the present invention were measured. The measurement results will be discussed below.

Figure 5:
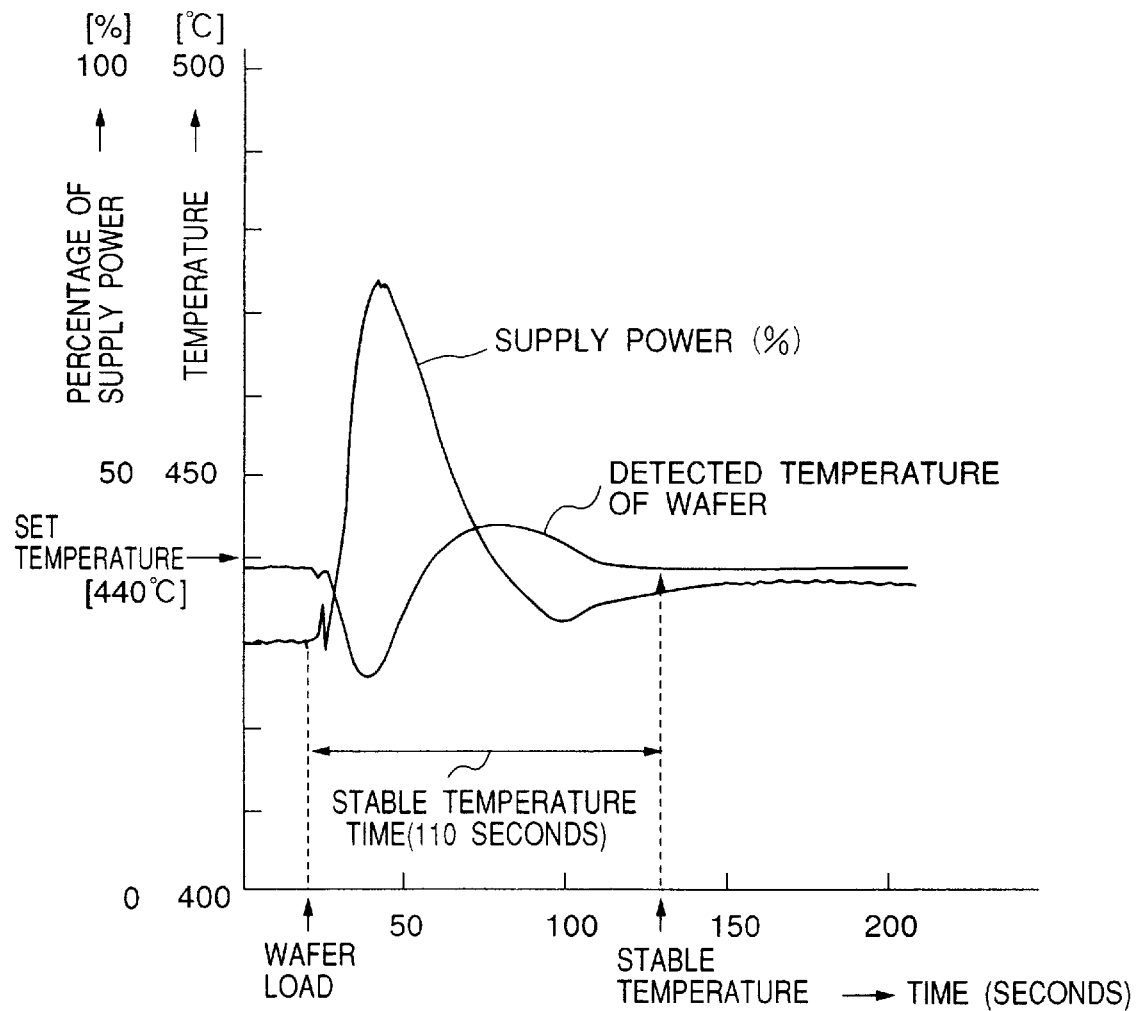
FIG. 5 is a graph showing the measured temperature of a wafer and the power supply when the object is controlled by a conventional method.
Figure 6:
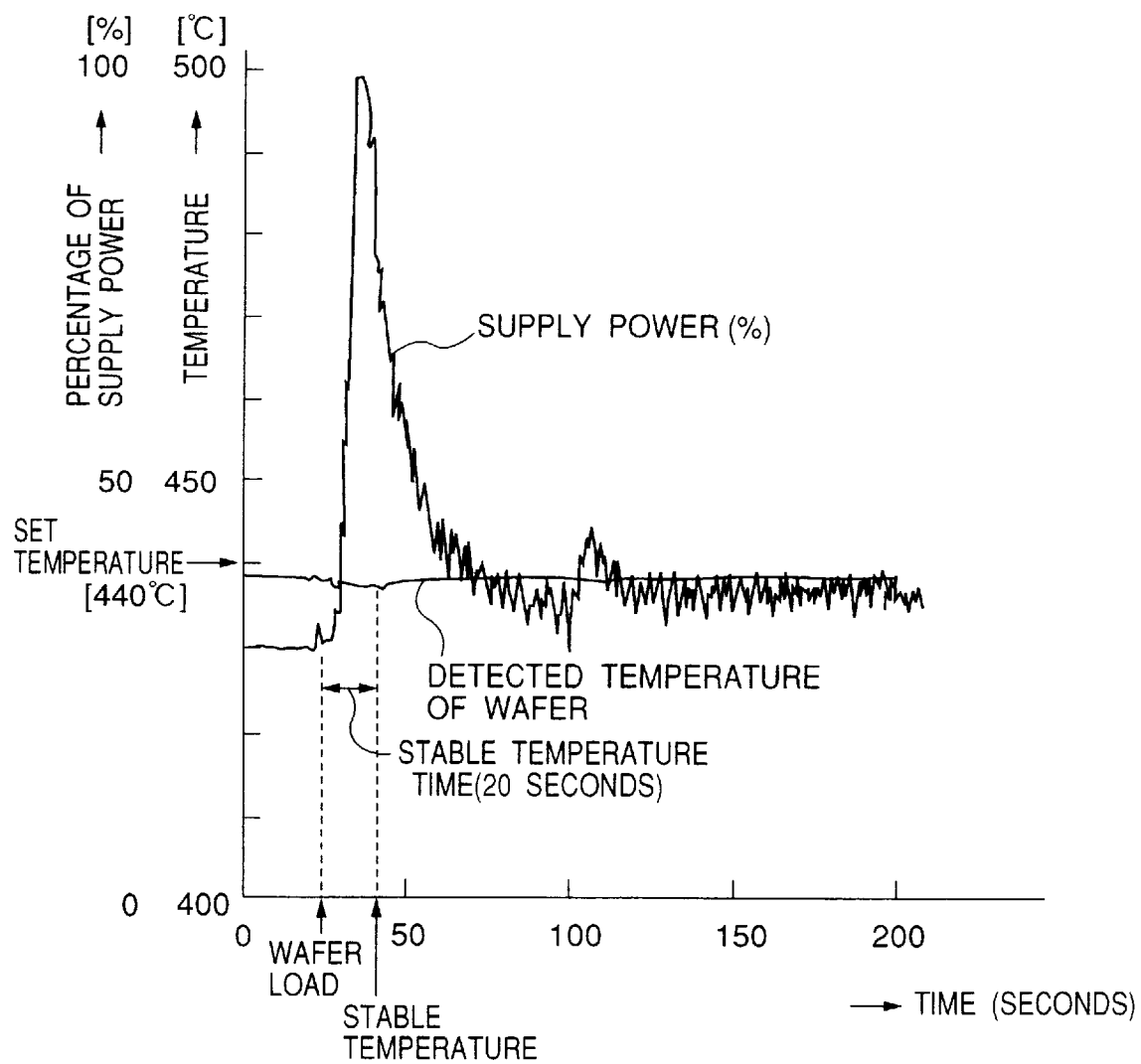
FIG. 6 is a graph showing the measured temperature of a wafer and the power supply when the object is controlled by an automatic control method according to the present invention.

FIG. 5 is a graph showing the measured temperature of the wafer and the supply power when controlled by the conventional method, and FIG. 6 is a graph showing the measured temperature of the wafer and the supply power when controlled by a method according to the present invention. In both graphs, the set temperature serving as the target value is 440° C.

In the case of the conventional method shown in FIG. 5, when the wafer W is loaded in the processing container, the measured value is decreased, so that the supply power is increased. However, the increased state of the supply power is mild and the increased amount is about 70% of a full power at the peak value. In addition, since the increased state of the supply power continues over a long time (about 50 seconds), overshoot occurs and a period of about 110 seconds are required until the temperature of the wafer is stabilized.

On the other hand, in the case of the method of the present invention, immediately when the wafer W is loaded and the detected temperature is slightly lowered, the supply power is increased and the peak value is a full power. In addition, the supply power is lowered to the original value for a short period of time (about 30 seconds). Therefore, the detected temperature of the wafer is stabilized within a period of about 20 seconds, and it was found that it is possible to stabilize the temperature of the wafer within a shorter period of time than that of the conventional method by a fifth to sixth times.

In the aforementioned preferred embodiment, while the target value, the range of temperature in which the weight control section operates, and the time required to increase the weight from 0 to 1 have been described as examples, the present invention should not be limited thereto, but they may be suitably changed in accordance with a control system of a processing equipment serving an object to be controlled.

In addition, while the temperature of the wafer has been controlled as a controlled variable, the present invention should not be limited thereto, but the present invention may be applied to various controlled variables, such as pressure and flow rate.

Moreover, while the sheet-type semiconductor treatment equipment has been described, the present invention may be widely applied to a batch-type semiconductor treatment equipment, or various control systems other than the semiconductor treatment equipment.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An automatic control system for controlling a controlled variable serving as an object to be controlled so that the object approaches a predetermined target value, said automatic control system comprising:

an optimum regulator for deriving a manipulated variable so that a controlled variable serving as an object to be controlled approaches a predetermined target value;

a comparing section for comparing the target value with the controlled variable serving as the object to derive a difference between the target value and the controlled variable;

a gain setting section for setting a gain serving to amplify the difference derived by the comparing section; and a weight control section for weighting the gain set by the gain setting section so as to increase the weight from 0 to 1 within a predetermined period of time, and for deriving a corrected manipulated variable by amplifying the difference by a weighed gain in response to the time when the difference comes within a range of a predetermined percentage of the target value, said weighted gain corresponding to a weighted gain at a time after the difference comes within the range of the predetermined percentage of the target value, said weight control section outputting the corrected manipulated variable so as to add the corrected manipulated variable to the manipulated variable derived by the optimum regulator.

2. The automatic control system according to claim 1, which further comprises a switching section for switching so as to input said corrected manipulated variable to an integrator of said optimum regulator, when said difference is deviated from said range of the predetermined percentage due to the change of said target value or disturbance, said corrected manipulated variable inputted to said integrator of said optimum regulator being a corrected manipulated variable when the addition of the corrected manipulated variable derived by said weight control section to said manipulated variable derived by said optimum regulator is stopped.

3. The automatic control system according to claim 1, wherein said object to be controlled is a semiconductor equipment, and said controlled variable is temperature detected in the semiconductor equipment.

4. An automatic control method for controlling a controlled variable serving as an object to be controlled so that the object approaches a predetermined target value, said automatic control method comprising the steps of:

deriving a manipulated variable so that a controlled variable serving as an object to be controlled approaches a predetermined target value by means of an optimum regulator;

comparing the target value with the controlled variable serving as the object to derive a difference between the target value and the controlled variable;

setting a gain serving to amplify the difference derived by the comparing section, by means of a gain setting section;

weighting the gain set by the gain setting section so as to increase the weight from 0 to 1 within a predetermined period of time;

deriving a corrected manipulated variable by amplifying the difference by a weighed gain in response to the time when the difference comes within a range of a predetermined percentage of the target value, said weighted gain corresponding to a weighted gain at a time after the difference comes within the range of the predetermined percentage of the target value; and outputting the corrected manipulated variable so as to add the corrected manipulated variable to the manipulated variable derived by the optimum regulator.

5. The automatic control method according to claim 4, which further comprises the step of switching so as to input said corrected manipulated variable to an integrator of said optimum regulator, when said difference is deviated from said range of the predetermined percentage due to the change of said target value or disturbance, said corrected manipulated variable inputted to said integrator of said optimum regulator being a corrected manipulated variable when the addition of the corrected manipulated variable derived by said weight control section to said manipulated variable derived by said optimum regulator is stopped.

6. The automatic control method according to claim 4, wherein said object to be controlled is a semiconductor equipment, and said controlled variable is temperature detected in the semiconductor equipment.

7. The automatic control system according to claim 2, wherein said object to be controlled is a semiconductor equipment, and said controlled variable is temperature detected in the semiconductor equipment.

8. The automatic control method according to claim 5, wherein said object to be controlled is a semiconductor equipment, and said controlled variable is temperature detected in the semiconductor equipment.

* * * * *